(12) United States Patent
Strickland et al.

(10) Patent No.: US 7,809,964 B1
(45) Date of Patent: Oct. 5, 2010

(54) STORAGE SYSTEM ASSEMBLY WITH DISTRIBUTED ENCLOSURE MANAGEMENT

(75) Inventors: Stephen Strickland, Foxboro, MA (US); Alex Joseph Sanville, Chelmsford, MA (US); Douglas Richard Sullivan, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 536 days.

(21) Appl. No.: 11/863,882

(22) Filed: Sep. 28, 2007

(51) Int. Cl.
*G06F 1/00* (2006.01)
*G06F 9/00* (2006.01)
*G06F 3/00* (2006.01)
*G06F 13/12* (2006.01)
*G06F 13/00* (2006.01)
*H05K 7/10* (2006.01)

(52) U.S. Cl. .................. 713/300; 713/1; 713/100; 713/330; 713/340; 710/8; 710/15; 710/62; 710/301; 711/100

(58) Field of Classification Search .............. 713/1, 713/100, 300, 330, 340; 710/8, 15, 62, 301; 711/100
See application file for complete search history.

(56) References Cited

U.S. PATENT DOCUMENTS

| 5,747,889 | A | 5/1998 | Raynham et al. | |
|---|---|---|---|---|
| 6,738,857 | B2 | 5/2004 | Sanders et al. | |
| 6,836,849 | B2* | 12/2004 | Brock et al. | 713/310 |
| 7,444,483 | B2* | 10/2008 | Taguchi et al. | 711/156 |
| 7,469,315 | B2* | 12/2008 | Watanabe et al. | 711/114 |
| 2003/0041204 | A1 | 2/2003 | Sanders et al. | |
| 2003/0111909 | A1 | 6/2003 | Liu et al. | |
| 2003/0112647 | A1 | 6/2003 | Liu et al. | |
| 2005/0180181 | A1 | 8/2005 | Gaudreau et al. | |
| 2007/0052296 | A1 | 3/2007 | Gaudreau et al. | |
| 2008/0052437 | A1* | 2/2008 | Loffink et al. | 710/302 |
| 2008/0126616 | A1* | 5/2008 | Kumasawa et al. | 710/42 |

OTHER PUBLICATIONS

Sullivan, Douglas et al.; "Environmental and Health Monitoring Circuitry for Storage Processor I/O Annex Module", Pending U.S. Appl. No. 11/395,460, filed Mar. 31, 2006.

* cited by examiner

*Primary Examiner*—Stefan Stoynov
(74) *Attorney, Agent, or Firm*—BainwoodHuang

(57) ABSTRACT

An I/O interface module of a storage system controller includes a management controller and power regulation and monitoring/control circuitry responsible for management of the I/O expansion module and pluggable I/O interface modules, which each include electrical power regulating circuitry to power circuit components. Temperature regulation components (e.g. fan and temperature sensor) provide a cooling airflow and monitor operating temperature. A controller works with the power regulation and monitor/control circuitry and temperature regulation components to perform first and second management activities concurrently. The first management activity involves managing the environmental operating conditions of the I/O expansion module itself, including (i) monitoring and regulating operating temperature and (ii) monitoring and controlling electrical power regulating circuitry of the power regulation and monitor/control circuitry. The second management activity involves managing environmental operating conditions of the I/O interface module, including (i) monitoring insertion and removal of the I/O interface module and reporting such insertion and removal to a separate controller within the storage system controller, (ii) controlling reset status of the I/O expansion module, and (iii) monitoring and controlling the electrical power regulating circuitry of the I/O interface module.

8 Claims, 8 Drawing Sheets

STORAGE SYSTEM ASSEMBLY WITH DISTRIBUTED ENCLOSURE MANAGEMENT

BACKGROUND

The present application is related to the field of storage system assemblies.

It is known to provide monitoring and control components and circuitry within a storage system assembly (such as a storage system controller assembly) to manage the operating environment of the storage system assembly itself, apart from the operational components and circuitry utilized to perform the data storage operations of the storage system assembly. For example, it is common to include cooling fans, temperature sensors, and associated monitoring and control circuitry to sense and manage the internal operating temperature of the storage system assembly so that operation occurs within a desired range of operating temperatures. It is also common to include power regulation circuitry that generates internal supply voltages for electrical components of the storage system assembly, and circuitry that monitors the operating voltages and power to ensure that safe and effective operational limits are observed.

SUMMARY

It can be desirable in a storage system assembly to include functional components in an incremental fashion, such as for example by providing input/output (I/O) connectors and associated mechanical, electrical and software resources to accept optional I/O interface modules and incrementally expand I/O capability. Along with such incremental expansion can come the need to provide associated management functionality such as the above-discussed monitoring and control of temperature, operating voltages, and other environmental operating conditions of the I/O interface modules.

Disclosed is a storage system controller assembly that achieves I/O expansion in a two-tier manner, and employs a corresponding management technique having two concurrent activities. I/O interface modules are optional hot-pluggable sub-assemblies of an I/O expansion module, which itself is an optional sub-assembly of a storage controller assembly. The I/O expansion module includes a management controller as well as power regulation and monitoring/control circuitry that is responsible for management of the I/O expansion module itself as well as management of the pluggable I/O interface module(s) of the I/O expansion module. The arrangement enables the incremental addition not only of the I/O interface modules but also of the associated management components, without unduly burdening the basic system or the I/O interface modules themselves.

A disclosed storage system controller includes a pluggable I/O expansion module which includes one or more I/O interface modules, each being a hot-pluggable sub-assembly of the I/O expansion module. An I/O interface module includes electrical power regulating circuitry receiving electrical power via the I/O expansion module and providing electrical power to circuit components of the I/O interface module. The I/O expansion module further includes power regulation and monitor/control circuitry receiving supply electrical power from the storage system controller and being operative to provide regulated electrical power to circuit components of the I/O expansion module. Temperature regulation components provide a cooling airflow and monitor operating temperature of the I/O expansion module.

A controller is operative in conjunction with the power regulation and monitor/control circuitry and the temperature regulation components to perform first and second management activities concurrently. In the first management activity, the environmental operating conditions of the I/O expansion module itself are managed, including (i) monitoring and regulating operating temperature and (ii) monitoring and controlling electrical power regulating circuitry of the power regulation and monitor/control circuitry. In the second management activity, environmental operating conditions of the I/O interface module are managed, including (i) monitoring insertion and removal of the I/O interface module and reporting such insertion and removal to a separate controller within the storage system controller, (ii) controlling reset status of the I/O expansion module, and (iii) monitoring and controlling the electrical power regulating circuitry of the I/O interface module.

In other aspects, the disclosed I/O expansion module includes additional functionality including a reset process that ensures that the power regulating circuitry of the I/O interface module is operating correctly before releasing a "power good" indicator to permit normal operation of the storage system controller, and functionality for programming field-programmable logic on the I/O interface module independently without control by a storage processor of the storage system controller. The storage system controller is relieved of much of the detail of managing the I/O expansion module and the I/O interface module(s).

DETAILED DESCRIPTION

Figure 1:
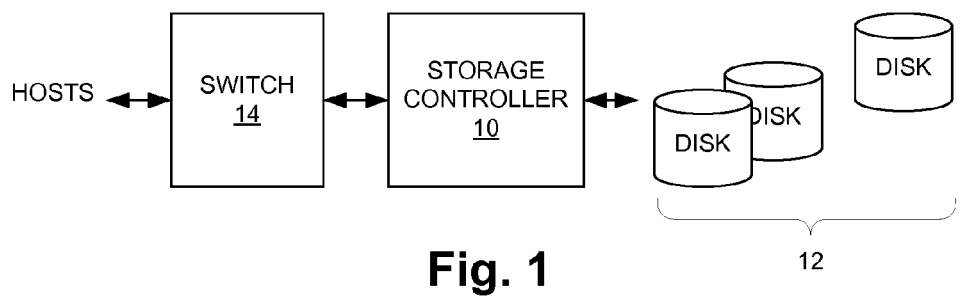
FIG. 1 is a block diagram of a data storage system in accordance with the present invention.

FIG. 1 shows a storage system including a storage controller 10 coupled to a plurality of disk drives (disks) 12. The storage controller 10 is also coupled to host computers (hosts, not shown) via one or more switches 14. In operation, storage requests generated by the hosts are routed through the switch 14 to the storage controller 10, which satisfies the requests using the storage resources provided by the disks 12. The storage controller 10 may implement semiconductor memory caching as temporary storage for data that resides on the disks 12. The configuration shown in FIG. 1 may be seen as a "storage area network" or SAN configuration. However, the storage controller 10 may also be used in other configurations, including directly attached to one or more hosts and attached to a network, the latter being referred to as "network attached storage" or NAS.

Figure 2:
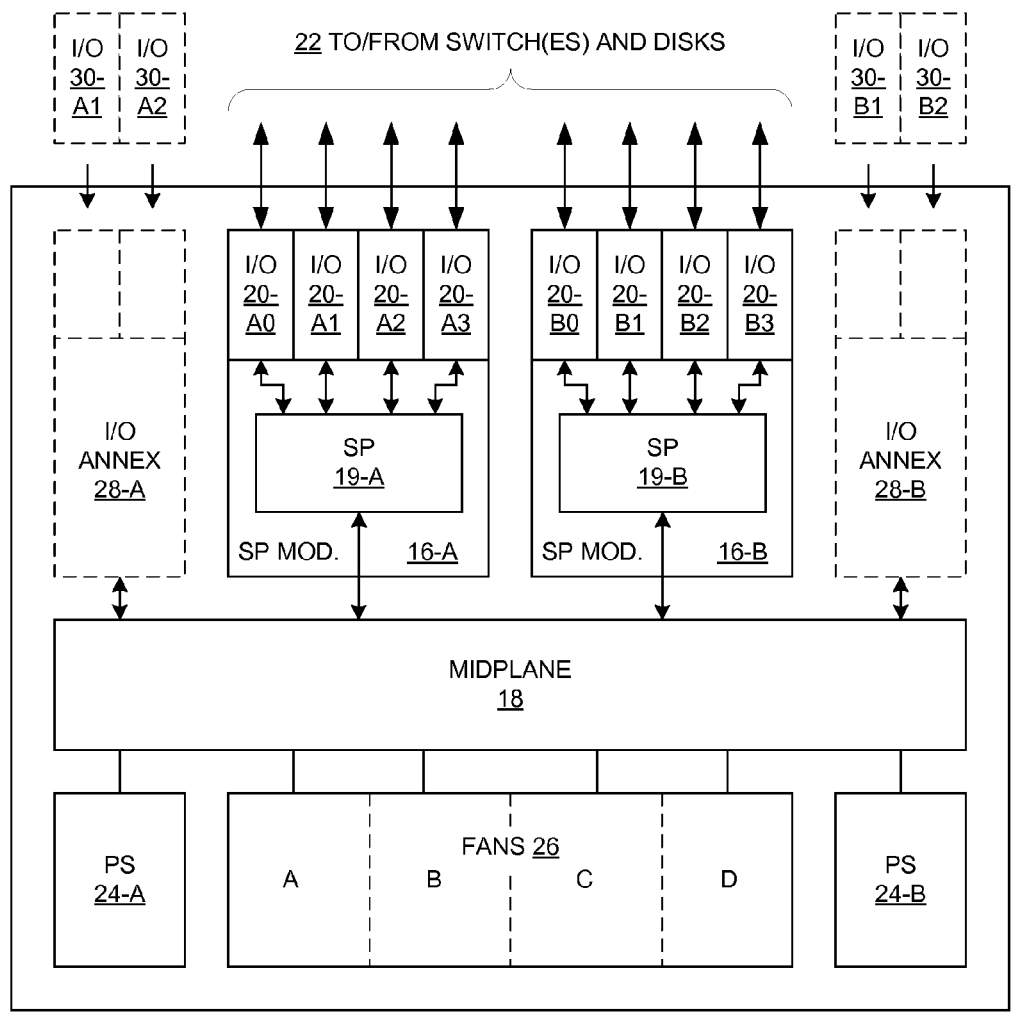
FIG. 2 is a block diagram of a storage controller in the data storage system of FIG. 1.

FIG. 2 shows a functional block diagram of the storage controller 10. A pair of storage processor (SP) modules 16 (shown as SP modules 16-A and 16-B) are connected to a midplane circuit board (midplane) 18. Each SP module 16 has a respective storage processor (SP) 19 (shown as SPs 19-A and 19-B) and a respective set of four input/output (I/O) modules 20 (shown as I/O 20-A0, 20-A1, etc.) which are connected to high-speed storage interconnect buses 22. The storage buses 22 provide connectivity to the disks 12 and switch 14 of FIG. 1. In one embodiment, I/O modules 20 of different types may be used in the storage controller 10. For example, I/O module 20-A0 may provide multiple Gigabit-Ethernet (GbE) ports, either electrical (RJ45), optical, or both, and I/O module 20-A1 may provide multiple Fibre channel (FC) optical ports. Each SP module 16 includes high-bandwidth "data mover" hardware as well as a processor complex (SP 19) which together implement all the control and data-moving functionality required for processing storage requests. The SP modules 16 may be configured as a redundant pair such that either can assume the processing workload of the other in the event one of the SP modules 16 fails.

Also connected to the midplane 18 are a pair of power supplies 24 (shown as PSs 24-A and 24-B) and four blowers or fans 26. The PSs 24 and fans 26 may also be configured for redundancy, such that one PS 24 can handle the entire load of the storage controller 10 in the event that the other PS 24 fails. The fans 26 exhibit redundancy in the following manner. Normally, all four fans 26 run at a nominal speed. If one fan 26 fails, then the remaining three fans 26 are fun at higher speed (e.g., full speed) at generate the necessary air flow. Once the failed fan is replaced, then all fans revert to running at nominal speed.

Also connected to the midplane 18 are a pair of I/O expansion modules 28 (shown as I/O "annexes" 28-A and 28-B). The I/O expansion modules 28 are optional, as indicated by the broken line depiction. When present, each I/O expansion module 28 provides an interface between the corresponding SP module (e.g. SP module 16-A for I/O annex 28-A) and a pair of hot-pluggable I/O interface modules 30 (shown as I/O modules 30-A and 30-B). Overall, each I/O annex 28 provides fifth and sixth I/O modules 30 for a corresponding SP module 16 using two X4 PCI-Express high-speed serial data links. Examples of such PCI-Express I/O modules 30 include those functioning as host bus adapters (HBAs), such as an iSCSI or 10-GbE adapter. The additional I/O capability can be added to the storage controller 10 as required by system requirements without requiring addition of an entire additional SP module 16 with its attendant overhead, notably the cost and real-estate devoted to a storage processor complex.

Figure 3:
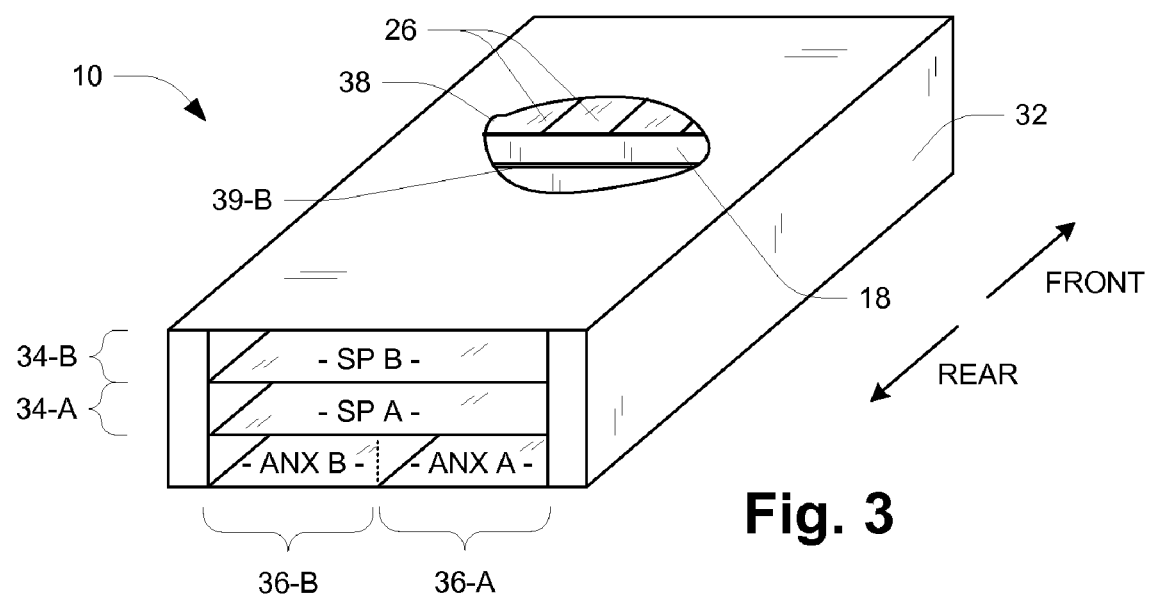
FIG. 3 is a perspective rear view of a physical embodiment of the storage controller of FIG. 2, referred to herein as a "storage controller assembly"

FIG. 3 is a rear perspective view of a physical packaging arrangement termed a "storage controller assembly" for the storage controller 10 of FIGS. 1-2. The various controller components are housed in a rack-mountable enclosure 32 of dimensions 19" wide, 4" high, and 30" deep. The enclosure is divided into three levels, one each for the two SP modules 16 and one level for both of the I/O annexes 28. Specifically, there are two SP mounting areas 34 (shown as 34-A and 34-B) and two I/O annex mounting areas 36 (shown as 36-A and 36-B). The SP modules 16 and I/O annexes 28 are implemented as rectangular circuit modules or "blades" that are inserted and extracted by being slid into or out of the respective mounting areas 34, 36.

As shown by a cutaway 38, the midplane 18 extends across the interior of the enclosure 32 approximately two-thirds of the way forward. An electrical connector 39-B that provides connections between the midplane 18 and the SP module 16-B is visible through the cutaway 38. Also visible are the fans 26 forward of the midplane 18. Although not shown in FIG. 3, the midplane 18 is configured by shape and inclusion of openings to permit a large rearward airflow from the fans 26 through the SP mounting areas 34 to cool the SPs 16 during operation. In one embodiment, the I/O annex mounting areas 36 is either uncooled or cooled by separate fans residing on each I/O annex module 28 when present.

Figure 4:
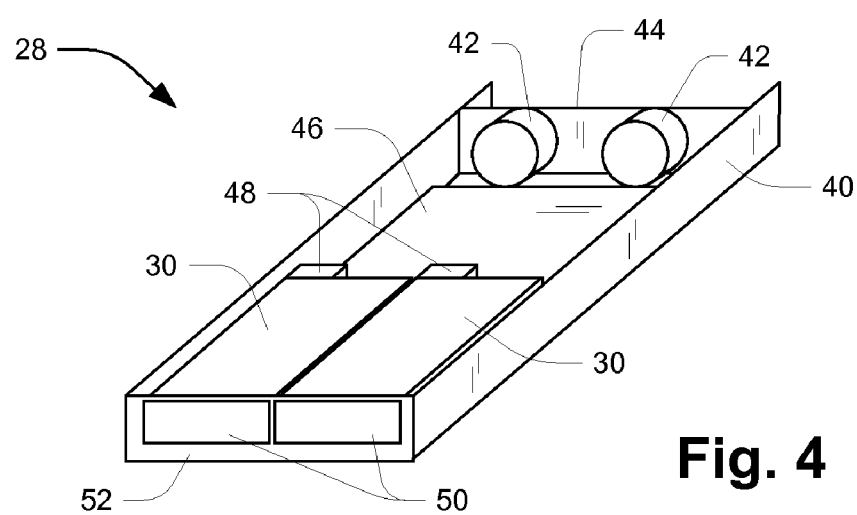
FIG. 4 is a perspective view of a physical embodiment of an I/O expansion module in the storage controller assembly of FIGS. 2 and 3.

FIG. 4 shows a physical arrangement for the I/O annex module 28. It includes a tray-like housing 40. Fans 42 are mounted on a front-facing bulkhead 44. Mounted within the housing 40 is an I/O annex circuit card 46 which includes a variety of circuitry as described in more detail below. The hot-pluggable I/O modules 30 mate with corresponding connectors 48 mounted to the I/O annex circuit card 46. The I/O modules 30 are inserted and removed via respective openings 50 of a rear bulkhead 52 of the housing 40.

Figure 5:
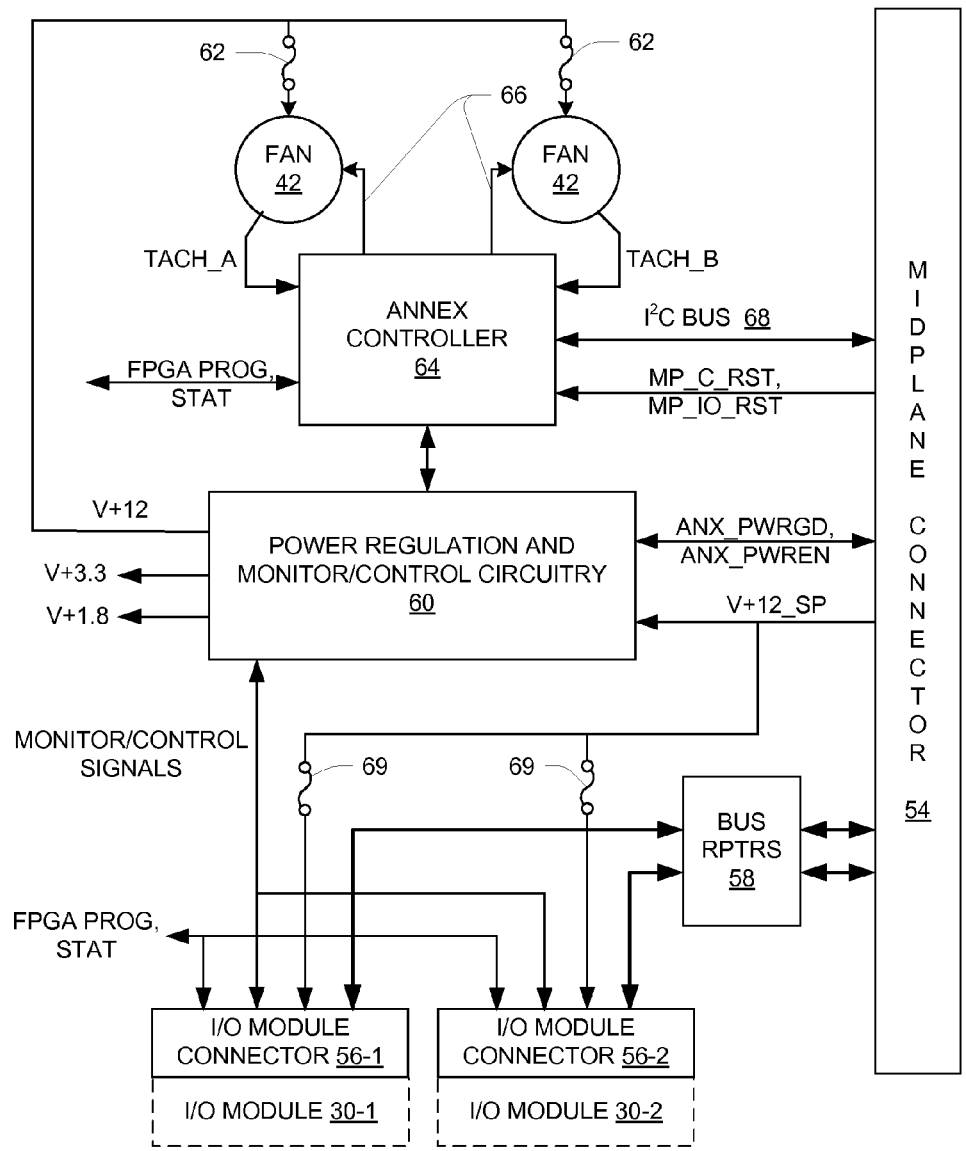
FIG. 5 is a schematic diagram of the I/O expansion module.

FIG. 5 is a block diagram of an I/O annex module 28. It includes respective connectors 54 and 56 for the midplane 18 and I/O option card 30. Bus repeater amplifiers (RPTRs) 58 provide for interconnection between an internal PCI-Express bus of the storage controller 10 (appearing on the midplane 18) and an external PCI-Express bus defined on each connector 56 and I/O module 30. The I/O annex module 28 also includes power regulation and monitor/control circuitry 60 that generates operating power for components of the I/O annex module 28 as well as performs a variety of monitoring and controlling functions. Among these are generating operating voltages V+12 (12 volts), V+3.3 (+3.3 volts) and V+1.8 (+1.8 volts) from an input supply voltage V+12 SP (12 volts) provided by the respective storage processor module 16 via the midplane 18. Other functions are performed as described in more detail below.

The I/O annex module 28 also includes a pair of fans 42 that provide the airflow for cooling the I/O annex module 28 and I/O modules 30 during operation. The fans 42 receive power from V+12 via respective fuses 62. An annex controller 64 is used to control and monitor fan operation. The annex controller 64 is part of a feedback control loop that includes respective tachometer signals TACH_A and TACH_B from the fans 52 and pulse-width-modulated fan speed control signals 66. The annex controller 64 is also used to monitor and control other aspects of the operation of the I/O annex module 28 as described below. The annex controller 64 communicates with the corresponding SP 16 via an Inter-IC (I2C) bus 66.

As shown, the I/O modules 30 receive operating supply voltage V+12 SP via respective fuses 69. This voltage is converted to lower operating voltages on each I/O module 30 by regulator circuits as described below.

Figure 6:
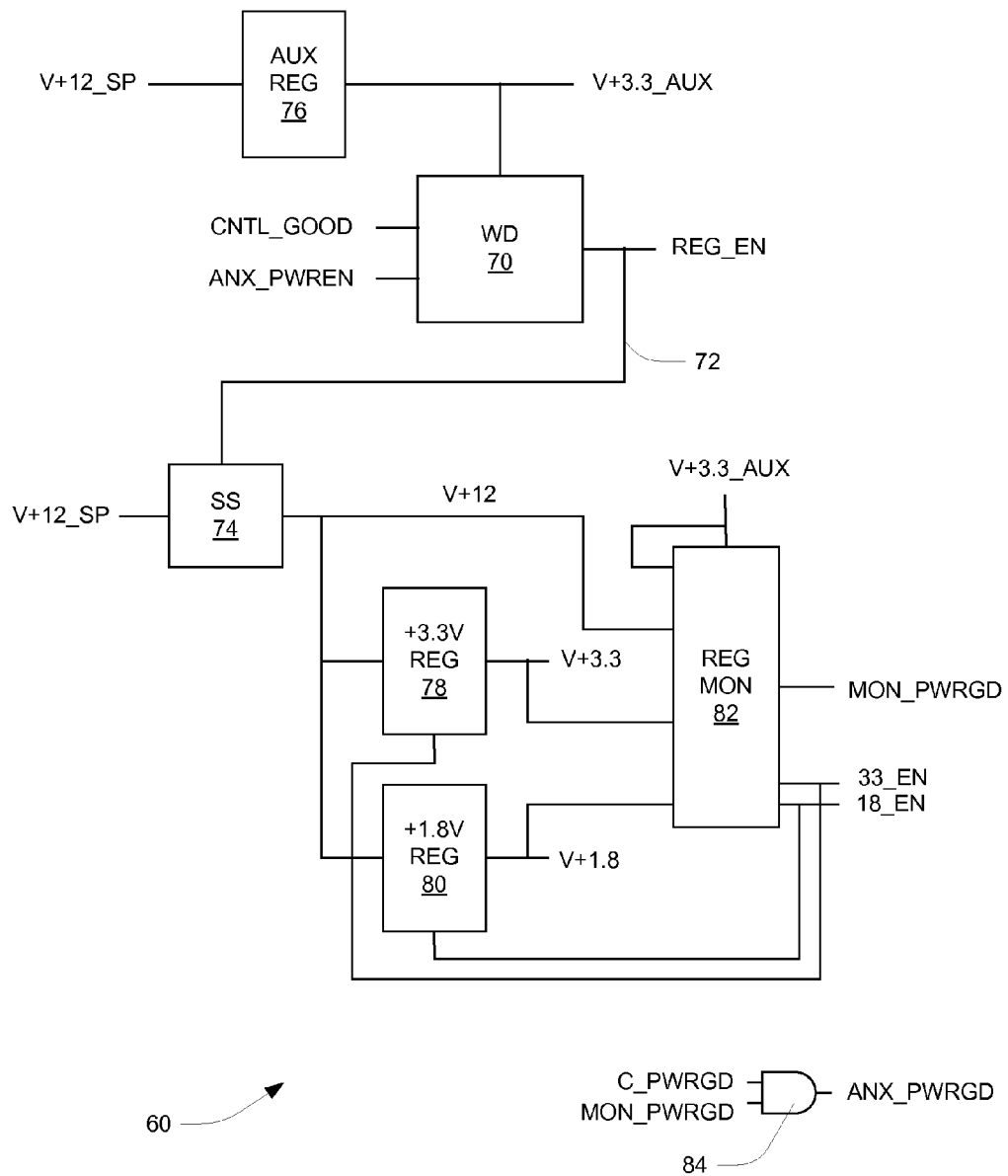
FIG. 6 is a schematic diagram of power regulation and monitor/control circuitry in the I/O expansion module.

FIG. 6 shows the power regulation and monitor/control circuitry 60. Included is a watchdog circuit (WD) 70 which generates a regulator enable (REG_EN) signal 72 to enable operation of power regulators, specifically to enable operation of a soft-start circuit (SS) 74 that generates V+12 from V+12 SP. The watchdog circuit 70 is powered by an auxiliary +3.3 volt power converter circuit (AUX REG) 76 powered directly from V+12_SP. The watchdog circuit 70 operates in response to both a "control good" signal CNTL_GOOD generated by the controller 64 as well as an annex power enable signal ANX_PWREN provided from the respective SP module 16 via the midplane 18. CNTL_GOOD simply toggles at a regular rate when the controller 64 is operating normally. The soft-start circuit 74 permits hot-plugging of the I/O annex module 28. V+12 is provided to additional regulators 78 and 80 that generate the operating voltages V+3.3 and V+1.8 respectively. A regulator monitor circuit (REG MON) 82 monitors the operating voltages to ensure that they are above a predetermined threshold (e.g., 1 volt). The regulator monitor circuit 82 is powered by V3.3_AUX. An output signal MON_PWRGD is asserted to indicate that all monitored voltages are above the threshold. Additionally, the regulator monitor circuit 82 generates respective enable signals 33_EN and 18_EN for the regulators 78 and 80 respectively. These enable signals are asserted during initialization and thereafter as long as the monitored voltages are correct, and each may be independently de-asserted to disable the respective regulator if the respective output voltage is found to be incorrect (i.e., below the threshold). A logic gate 84 generates an annex power good signal ANX_PWRGD when both the MON_PWRGD signal and a separate control signal C_PWRGD from the controller 64 are asserted. The control signal C_PWRGD enables the controller 64 to temporarily override the indication from the regulator monitor circuit 82 as part of initialization, for example to provide an opportunity for initial testing of the fans 42 to ensure that they are operating properly before providing the ANX_PWRGD indication of proper operation of the environmental circuitry on the I/O annex module 28.

Figure 7:
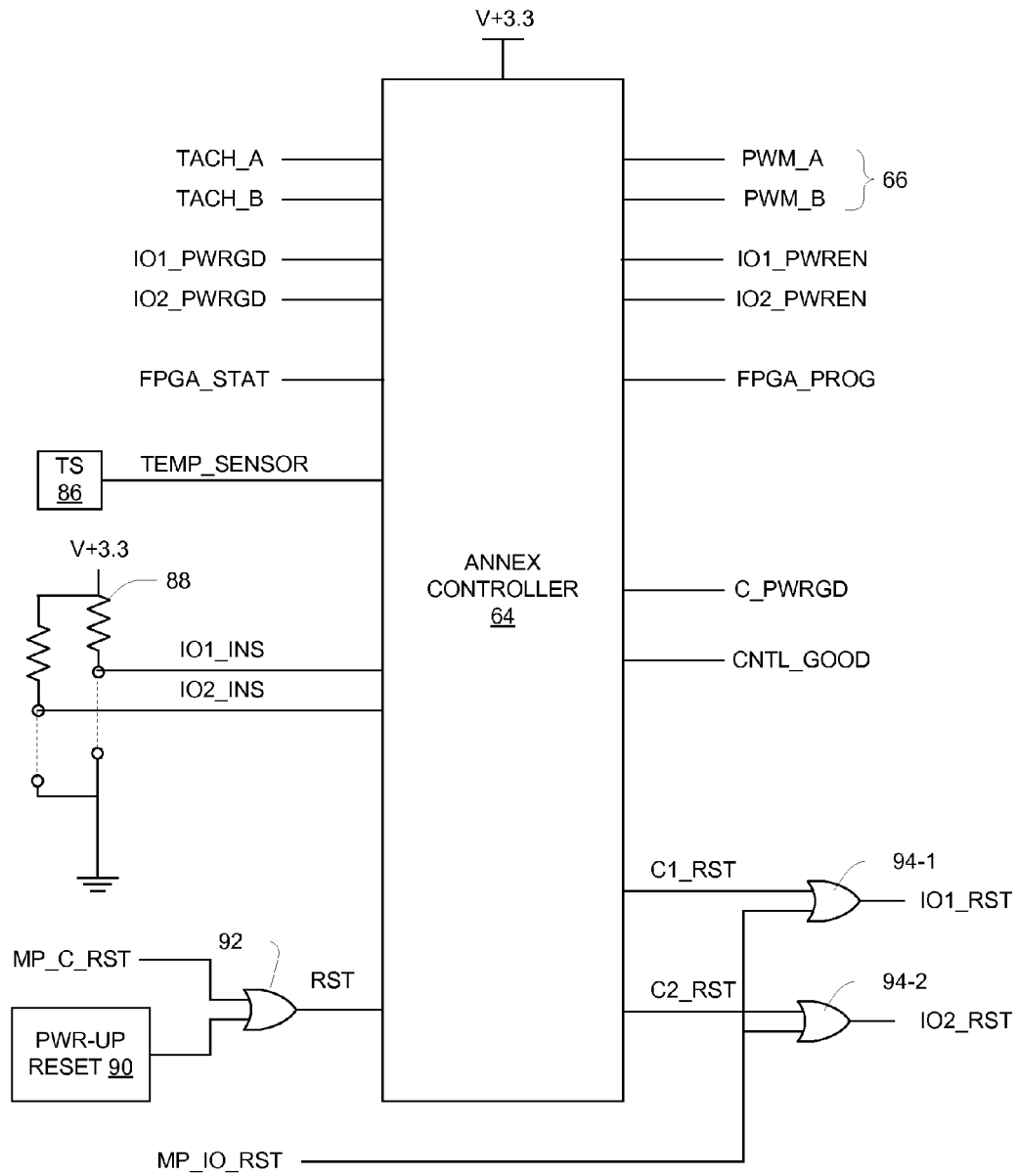
FIG. 7 is a schematic diagram of interconnections to a controller and related circuitry in the I/O expansion module.

FIG. 7 illustrates various signals provided to or generated by the annex controller 64. The annex controller 64 receives the signals TACH_A and TACH_B generated by the fans 42. During normal operation, each of these signals includes regularly spaced pulses at a frequency proportional to the rotational speed of the corresponding fan 42. The controller 64 uses the TACH_A and TACH_B signals (1) as feedback signals in a control loop that regulates fan speed, and (2) to monitor whether the fans 42 are operating at all. The PWM_A and PWM_B signals are the PWM control signals 66 for the fans 42. The annex controller 64 also receives a TEMP_SENSOR signal from a temperature sensor 86 to detect any over-temperature condition that may develop.

The annex controller 64 also receives signals IO1_INS and IO2_INS each indicating whether the respective I/O interface module 30 is inserted (present) into the I/O annex circuit module 46. These active-low signals are asserted when a shorting etch on the corresponding I/O interface module 30 (represented by dotted lines) connects the signal to ground. When the I/O interface module is not present, a respective resistor 88 pulls the signal high, which is the de-asserted state.

The annex controller 64 also receives the signals IO1_PWRGD, IO2_PWRGD, and FPGA_STAT, and generates the signals CNTL_GOOD, C_PWRGD, FPGA_PROG, IO1_PWREN and IO2_PWREN as shown. Additionally, reset circuitry includes a power-up reset circuit 90 and an OR gate 92, enabling the controller 64 to be reset both on power-up of the I/O annex 28 as well as on command from the corresponding SP module 16 via the signal MP_C_RST. Reset signals IO1_RST and IO2_RST for the respective I/O interface modules 30 are generated by OR gates 94, each receiving a respective individual reset signal (C01_RST, C02_RST) from the controller 64 as well as a common reset signal MP_IO_RST from the SP module 16.

Figure 8:
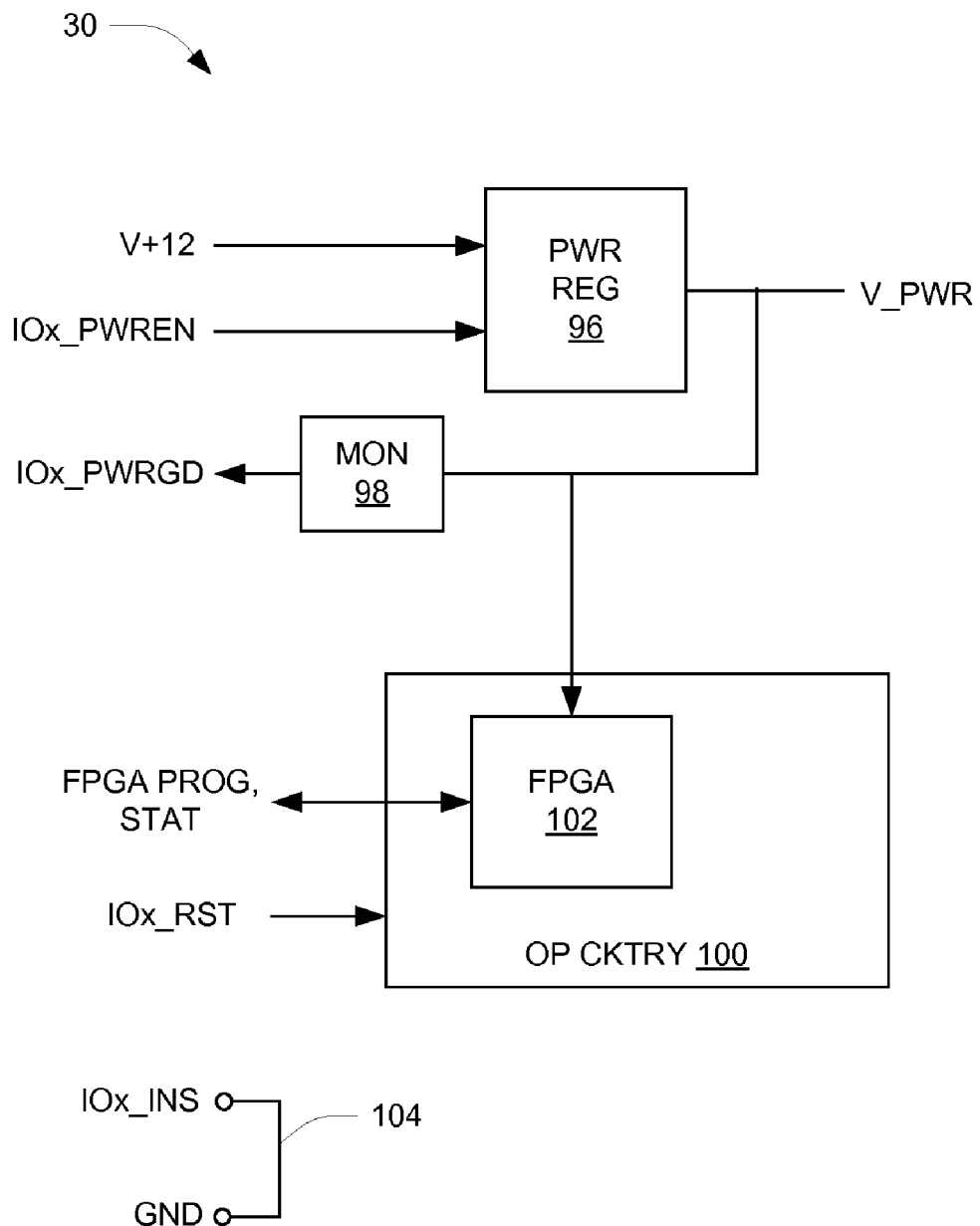
FIG. 8 is a schematic diagram of an I/O interface module forming a pluggable sub-assembly of the I/O expansion module.

FIG. 8 is a schematic of pertinent circuitry on an individual I/O interface module 30. Operating power V_PWR is generated from V+12 by one or more power regulators (PWR REG) 96, and is monitored by monitor circuitry 98 to generate the I/O module power good signal IOx_PWRGD. The operating power is provided to operating circuitry (OP CKTRY) 100 which may include, for example, complex interface circuitry that effects high-speed transfer of data between the internal PCI-Express bus and an external storage interconnect bus (e.g., buses 22 in FIG. 2). Included in the operating circuitry 100 is a field-programmable gate array (FPGA) 102 or similar field-programmable logic. As indicated above, the program "image" (description of logic functionality) for the FPGA 102 is downloaded during initialization by the annex controller 64, which maintains a copy of the image as provided to it by the storage processor module 16. This downloading is done independently, i.e., without exertion of any control from the respective SP 19. Also shown in FIG. 8 is the shorting etch 104 providing the indication IOx_INS of the presence of the I/O interface module 30 to the controller 64 as described above.

Figure 9:
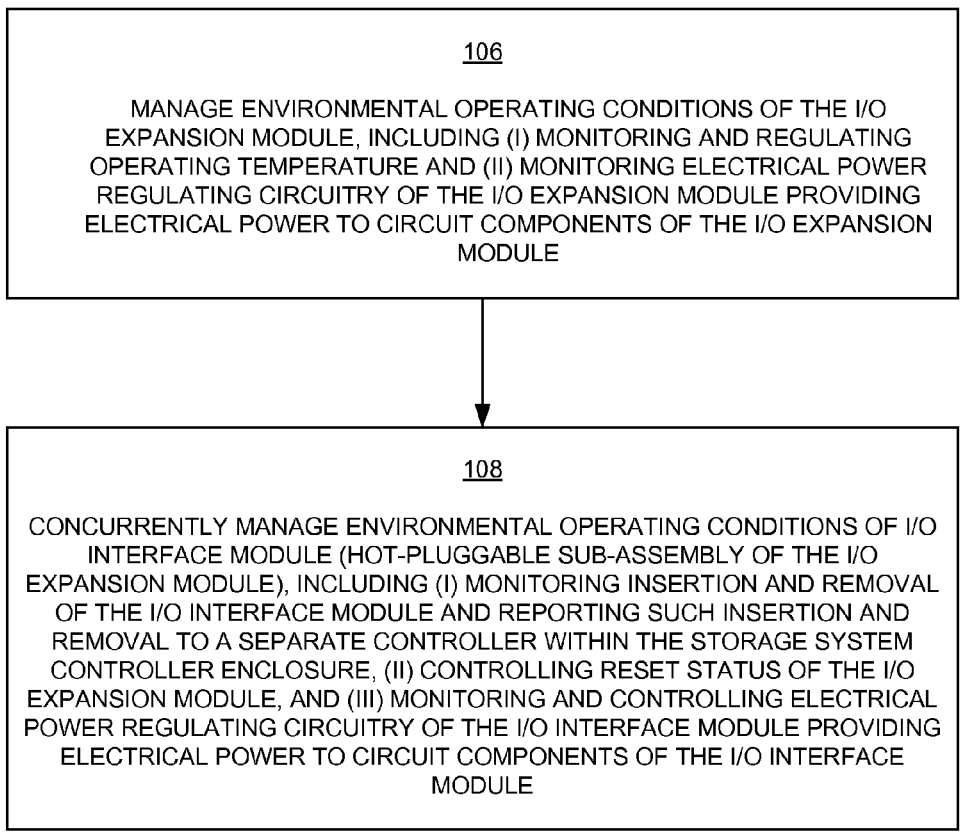
FIGS. 9-10 are flow diagrams depicting certain operations of the I/O expansion module.

FIG. 9 illustrates the overall operation of the I/O annex module 28 with respect to environmental monitoring and control, which is performed by the annex controller 64 in conjunction with the power regulation and monitor/control circuitry 60. Overall, first and second management activities are performed concurrently, as shown by steps 106 and 108.

In the first management activity of step 106, the environmental operating conditions of the I/O expansion module 28 are managed, including (i) monitoring and regulating operating temperature (using temperature sensor 86 and fans 42) and (ii) monitoring electrical power regulating circuitry of the I/O expansion module providing electrical power to circuit components of the I/O expansion module 28 (soft start circuit 75 and regulators 78, 80).

In the second management activity of step 108 (concurrent with the first management activity 106), the environmental operating conditions of an I/O interface module (i.e., an I/O module 30) are managed, including (i) monitoring insertion and removal of the I/O interface module and reporting such insertion and removal to a separate controller (e.g., SP 19) within the storage system controller enclosure, (ii) controlling reset status of the I/O interface module, and (iii) monitoring and controlling electrical power regulating circuitry of the I/O interface module providing electrical power to circuit components of the I/O interface module (e.g. power regulator 96).

Figure 10:
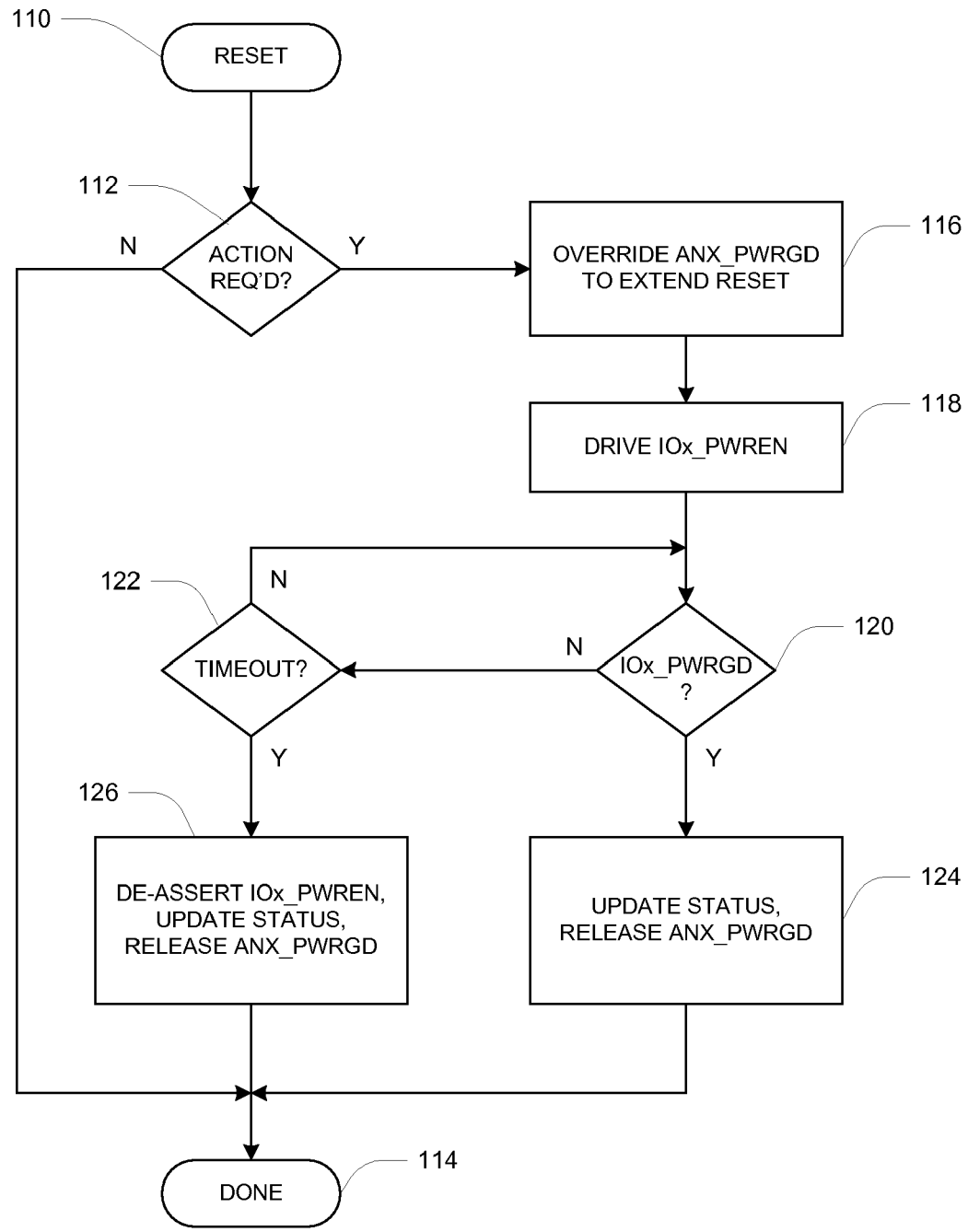

FIG. 10 illustrates a reset process performed by the annex controller 64 in conjunction with other circuit elements as appropriate. This process is performed with respect to each of the I/O modules 30-1 and 30-2 that may be installed in the I/O annex 28. At step 110, a reset occurs (which may be a power-up reset or a warm reset issued from an SP 19). At step 112, it is determined whether any action is required, which is based on whether the I/O module 30 needs to be powered up. If not, then the I/O module 30 is simply permitted to respond to the reset, and otherwise the process is done (step 114). If action is required, then a power-up process is performed. Beginning at step 116, the controller 64 overrides the ANX_PWRGD signal (forces it de-asserted) to extend the reset, and at step 118 asserts the power enable signal IOx_PWREN to enable operation of the power regulator 96 on the I/O module 30. In a timed loop shown as steps 120 and 122, the controller 64 waits for a predetermined timeout period for the power good signal IOx_PWRGD to become asserted. If this occurs, then at step 124 the status of the I/O module 30 is updated to reflect its powered-up status, and the ANX_PWRGD signal is released, which normally results in the ending of the reset so that normal system operation ensues. If the signal IOx_PWRGD does not become asserted before the timeout of step 122, then at step 126 the power enable signal IOx_PWREN is de-asserted to disable operation of the I/O module 30, and the status of the I/O module 30 is updated to reflect that it is not operational. Also, the ANX_PWRGD signal is released to end the system reset.

What is claimed is:

1. A method of operating a controller of an I/O expansion module in a storage system controller, comprising:

in a first management activity, managing environmental operating conditions of the I/O expansion module, including (i) monitoring and regulating operating temperature and (ii) monitoring electrical power regulating circuitry of the I/O expansion module providing electrical power to circuit components of the I/O expansion module; and in a second management activity concurrent with the first management activity, managing environmental operating conditions of an I/O interface module being a hot-pluggable sub-assembly of the I/O expansion module, including (i) monitoring insertion and removal of the I/O interface module and reporting such insertion and removal to a separate controller within the storage system controller, (ii) controlling reset status of the I/O expansion module, and (iii) monitoring and controlling electrical power regulating circuitry of the I/O interface module providing electrical power to circuit components of the I/O interface module.

2. A method according to claim 1, wherein the second management activity further includes a reset process performed upon occurrence of a reset of the I/O expansion module, the reset process including:

determining whether the I/O interface module is already powered and included in operation of the storage system controller;

if the I/O interface module is determined not to be already powered and included in operation of the storage system controller, then performing a power-up process including:

A) de-asserting an expansion module power-good signal to extend the duration of the reset;

B) asserting a power-enable signal to the I/O interface module to enable operation of a power regulator thereon;

C) determining whether a power-good signal becomes asserted by the I/O interface module within a predetermined timeout period;

D) if the power-good signal becomes asserted by the I/O interface module within the predetermined timeout period, then (i) updating a status of the I/O interface module to reflect a powered-up status, and (ii) releasing the expansion module power-good signal to end the reset and begin normal system operation; and E) if the power-good signal does not become asserted by the I/O interface module within the predetermined timeout period, then (i) de-asserting the power-enable signal to the I/O interface module to disable operation of the I/O interface module, (ii) updating the status of the I/O interface module to reflect that it is not operational, and (iii) releasing the expansion module power-good signal to end the reset and begin normal system operation; and if the I/O interface module is determined to be already powered and included in operation of the storage system controller, then refraining from performing the power-up process and permitting the I/O interface module to complete its reset operation.

3. A method according to claim 2, wherein the second management activity further includes ongoing monitoring of the power-good signal from the I/O interface module to detect an operational failure.

4. A method according to claim 1, wherein the second management activity further includes loading an operational image into programmable logic on the I/O interface module, the loading being initiated independently by the controller without exertion of control by a storage processor of the storage system controller.

5. An I/O expansion module for use in a storage system controller, comprising:

an I/O interface module being a hot-pluggable sub-assembly of the I/O expansion module, the I/O interface module including electrical power regulating circuitry receiving electrical power via the I/O expansion module and providing electrical power to circuit components of the I/O interface module;

power regulation and monitor/control circuitry receiving supply electrical power from the storage system controller and being operative to provide regulated electrical power to circuit components of the I/O expansion module;

temperature regulation components operative to provide a cooling airflow and to monitor operating temperature of the I/O expansion module; and a controller operative in conjunction with the power regulation and monitor/control circuitry and the temperature regulation components to:

(1) in a first management activity, manage environmental operating conditions of the I/O expansion module, including (i) monitoring and regulating operating temperature and (ii) monitoring and controlling electrical power regulating circuitry of the power regulation and monitor/control circuitry; and (2) in a second management activity concurrent with the first management activity, manage environmental operating conditions of the I/O interface module, including (i) monitoring insertion and removal of the I/O interface module and reporting such insertion and removal to a separate controller within the storage system controller, (ii) controlling reset status of the I/O expansion module, and (iii) monitoring and controlling the electrical power regulating circuitry of the I/O interface module.

6. An I/O expansion module according to claim 5, wherein the second management activity further includes a reset process performed upon occurrence of a reset of the I/O expansion module, the reset process including:

determining whether the I/O interface module is already powered and included in operation of the storage system controller;

if the I/O interface module is determined not to be already powered and included in operation of the storage system controller, then performing a power-up process including:

A) de-asserting an expansion module power-good signal to extend the duration of the reset;

B) asserting a power-enable signal to the I/O interface module to enable operation of a power regulator thereon;

C) determining whether a power-good signal becomes asserted by the I/O interface module within a predetermined timeout period;

D) if the power-good signal becomes asserted by the I/O interface module within the predetermined timeout period, then (i) updating a status of the I/O interface module to reflect a powered-up status, and (ii) releasing the expansion module power-good signal to end the reset and begin normal system operation; and E) if the power-good signal does not become asserted by the I/O interface module within the predetermined timeout period, then (i) de-asserting the power-enable signal to the I/O interface module to disable operation of the I/O interface module, (ii) updating the status of the I/O interface module to reflect that it is not operational, and (iii) releasing the expansion module power-good signal to end the reset and begin normal system operation; and if the I/O interface module is determined to be already powered and included in operation of the storage system controller, then refraining from performing the power-up process and permitting the I/O interface module to complete its reset operation.

7. An I/O expansion module according to claim 6, wherein the second management activity further includes ongoing monitoring of the power-good signal from the I/O interface module to detect an operational failure.

8. An I/O expansion module according to claim 5, wherein the second management activity further includes loading an operational image into programmable logic on the I/O interface module, the loading being initiated independently by the controller without exertion of control by a storage processor of the storage system controller.

* * * * *